Dec. 15, 1970   D. F. FAIRBANKS ET AL   3,548,351
COMPOSITE-STRIP CONDUCTOR CONTAINING
NIOBIUM-TITANIUM SUPERCONDUCTOR
Filed March 6, 1967   2 Sheets-Sheet 1
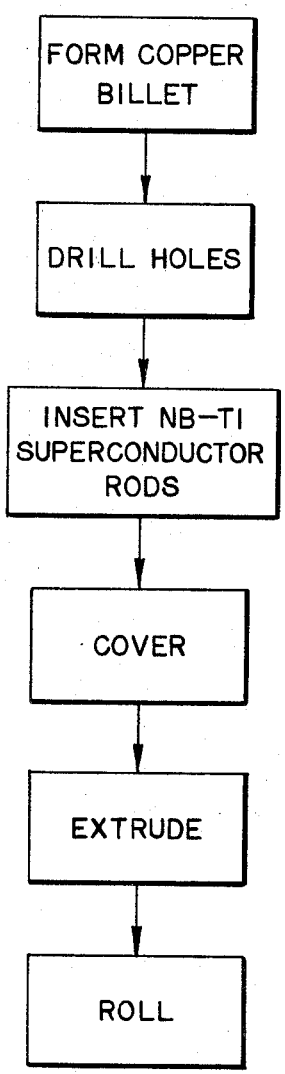
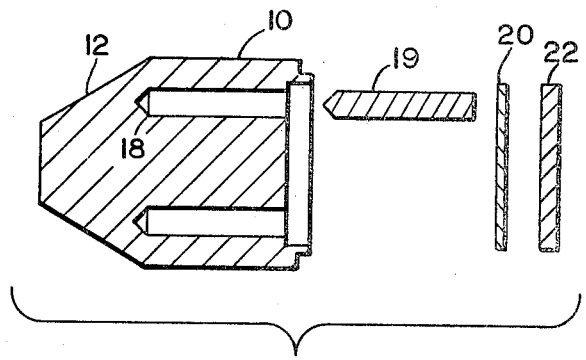
FIG. 2
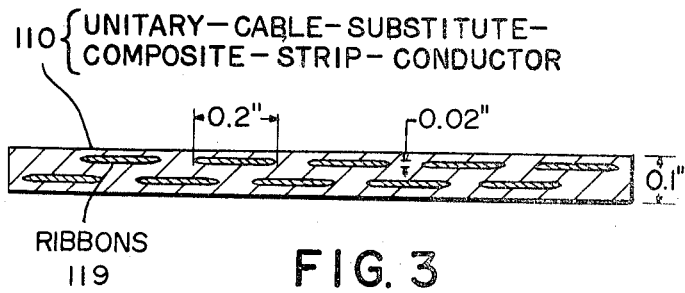
FIG. 3
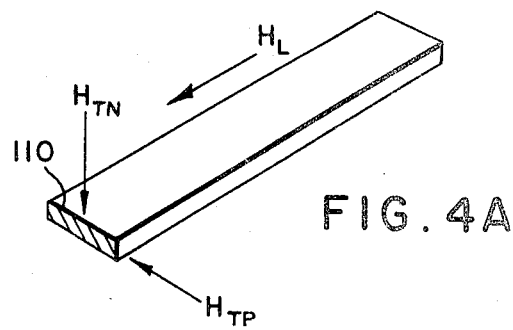
FIG. 4A
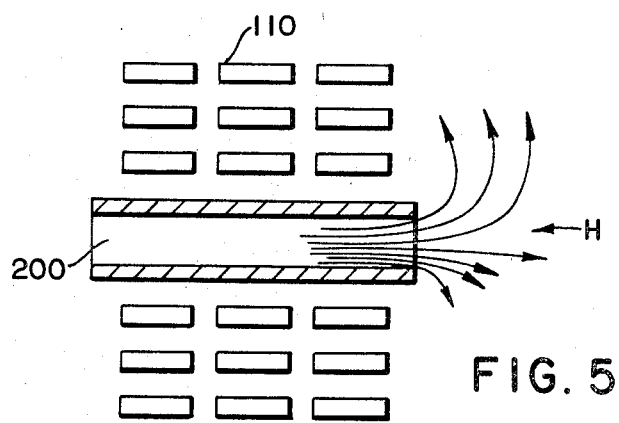
FIG. 5

United States Patent Office 3,548,351
Patented Dec. 15, 1970

3,548,351
COMPOSITE-STRIP-CONDUCTOR CONTAINING NIOBIUM-TITANIUM SUPERCONDUCTOR
Daniel F. Fairbanks, Winchester, Warren L. Larson, Lexington, and Robert N. Randall, and James Wong, Wayland, Mass., assignors to National Research Corporation, Newton Highlands, Mass., a corporation of Massachusetts
Filed Mar. 6, 1967, Ser. No. 621,053
Int. Cl. H01f 7/22
U.S. Cl. 335—216         3 Claims

ABSTRACT OF THE DISCLOSURE

Superconductive electromagnets are constructed of copper/niobium-titanium strip windings with the magnetic field oriented transversely parallel to the strip winding in the zone of most intense magnetic field. The strip is so fabricated that the superconductive niobium-titanium therein has an anisotropic critical current versus field characteristic that is less vulnerable to a magnetic field oriented transversely parallel than to one oriented transversely normal.

BACKGROUND

Related applications.—Application Ser. No. 534,177 filed Mar. 14, 1966, by Wong et al.; application Ser. No. 557,407 filed Sept. 6, 1966 by Wong et al.

Reference publications.—French Pat. 1,440,228 (Stekly and Kantrowitz); Laverick—Performance Characteristics of Small Superconducting Coils, pp. 105–112, International Advances in Cryogenic Engineering (Timmerhaus, ed., 1965); Walket et al.—Microstructure and Training of Nb-Zr High Field Superconductors, pp. 49–70 of Metallurgy of Advanced Electronic Materials (Brock, ed., 1963); and Walker et al.—Field Dependent Anisotropy of the Critical Current in Nb-Zr Rolled Strip, pp. 99–113 of Superconductors (Tannenbaum, ed., 1962).

The present invention relates to electromagnets wound from superconductive wire or ribbon to generate high magnetic fields on the order of 10–100 kilogauss and more while currents on the order of thousands of amperes are carried through the winding with zero resistance. A superior unitary cable substitute useful for such windings was described in the above application 534,177 (Wong et al.). Further improvements in fabrication of such winding materials and other forms of niobium-titanium alloy were described in application 577,407; viz, the use of a high ratio of area reduction through cold work with appropriate intermediate heat treatment to substantially increase critical currents. The present application presents a further improvement over the above Wong et al. applications for instances where the magnet is of such design that the field approaches the windings primarily from a transverse parallel direction. The present invention is particularly suitable where large cross-section unitary-cable-substitutes are required. In such a case, the critical current enhancement benefits of the working process of application 577,407 cannot be realized. The present invention provides an alternative way of realizing similar benefits.

GENERAL DESCRIPTION

In application Ser. No. 543,177 the winding material is prepared by providing a copper billet containing superconductive alloy rods within its cross-section and working the billet down to round wire and finally flattening the wire to a ribbon. In accordance with the present invention the copper billet is flattened at an early stage of processing and rolled down to final ribbon form for use as a superconductive electromagnet winding. This variation in processing produces an unusually high anistropy in the critical current versus magnetic field characteristics of the final product. That is the critical current under a given applied field varies strongly as a function of the direction of the applied field. The factor of anisotropy is at least two and generally 3–4 or higher.

The anistropy factor ($a$) is given by:

$$a = H_{TP}/H_{TN}$$

where $H_{TN}$ is the applied magnetic field in a direction transverse and normal to the ribbon at a given critical current and $H_{TP}$ is the higher applied magnetic field in a direction transverse and parallel to the ribbon necessary to produce quenching at the same current.

The composite-strip-conductor is also characterized by excellent thermal and electrical stability as described in application Ser. No. 534,177.

It is therefore the object of the invention to provide superconductor cable substitute that is especially useful for magnet designs where a strip winding is required.

SPECIFIC DESCRIPTION

A preferred embodiment of the invention is now specifically described with reference to the accompanying drawings wherein:

FIG. 1 is a process flow chart.

FIG. 2 is a cross-section view of a copper billet at an early stage of processing.

FIG. 3 is a cross-section view of the final composite strip at the end of processing.

FIG. 4A is a schematic drawing of a section of composite strip illustrating the definitions of various components of magnetic field applied to the strip.

FIG. 5 is a schematic drawing of a solenoid wound from the strip of FIG. 3.

Figure 4:
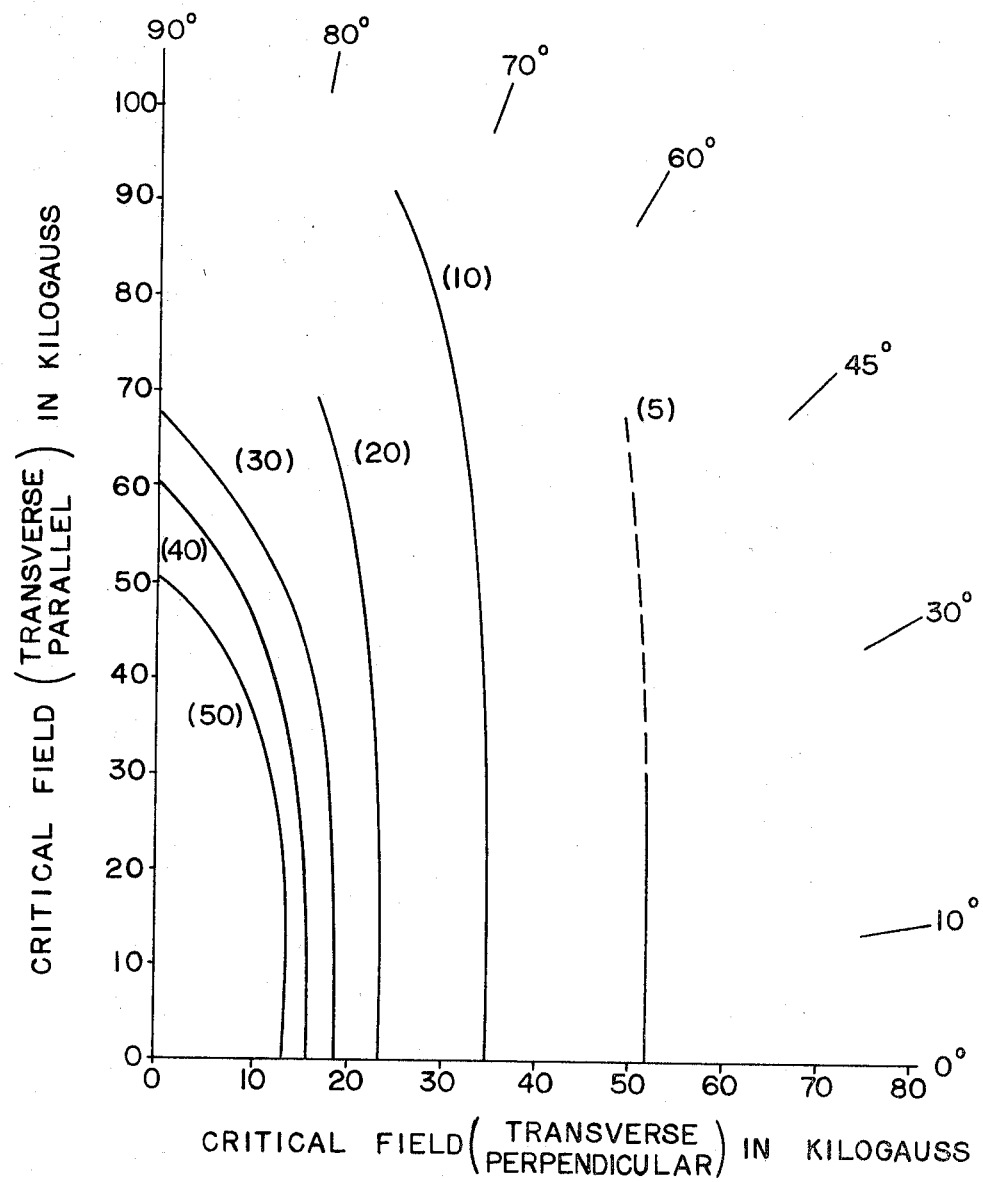
FIG. 4 is a graph of critical field with the various curves representing different critical current values. The elliptical form of the curves demonstrates the extreme anistropy of the strip of FIG. 3.

Referring now to the block diagram process flow chart of FIG. 1 and the cross-section view of FIG. 2 a copper billet 10 (typically 9 inches diameter, 12 inches long) is fabricated with a 30° starting bevel 12. Long holes 18 (typically of one inch diameter and 7.25 inches long) are drilled through the billet parallel to the billet axis to form a peripheral array of ten holes. Rods 19 of superconductive alloy (niobium—48 w/o titanium) are formed by arc melting, forging at 600° F. and then swaging at room temperature to a final diameter of $63/64$ inch and inserted into the holes 18. The back of the billet is covered by a zirconium foil 20 and a copper cap 22 welded to the billet. The billet is then extruded at 1200–1400° F. and 1350 tons pressing force and a ram speed of 30 inches per minute to form a 1.5 inches thick by 2 inches wide bar for a reduction of 20 times in area. As a result of the extrusion, the rods 19 contained in the billet are formed into rods having an irregular surface of about ⅛ inch diameter.

The billet is then rolled at room temperature to a final strip thickness of 0.1 inch while the width of two inches is maintained. The rolling is done in about 50 passes with 5 percent thickness reduction per pass. The rolling thus involves a 15 times reduction in area for a total area reduction, including extrusion, of 300 times.

The resultant strip 110 is shown in cross-section in FIG. 3 and the contained superconductive rods have by this time been converted to ribbons 119 with a width of about .2 inch and a thickness of .02 inch. These ribbons form essentially two rows.

Each of the ribbons 119 possess a remarkable anisotropy as a result of its rolling fabrication history which is demonstrated by the curves of FIG. 4.

In FIG. 4, the critical field applied transversely normal (i.e. perpendicular) is plotted on the x-axis; the critical field applied transverse parallel is plotted on the y-axis. The meaning of these terms will be apparent from FIG. 4A which shows a portion of strip 110 subject to a longitudinal field $H_L$, a transverse normal field $H_{TN}$ and a transverse parallel field $H_{TP}$. In FIG. 4 the various curves are for different values of critical current. The data of FIG. 4 were obtained by etching away the copper from a portion of strip 110 manufactured as described above and testing a single ribbon superconductor 119 with magnetic field applied at different angles, from transverse normal to transverse parallel—0° ($H_{TN}$), 10° ($H_{TN10}$), 30° ($H_{TN30}$), 45°, 60°, 70°, 80°, 90° ($H_{TP}$), at currents (per $5 \times 10^{-4}$ cm.² of cross-section) of 50, 40, 20, 30, and 10 amperes as shown by the various curves. The sharp anisotropy is shown by the curves. At 50 amperes the sample had critical fields of 50 kilogauss parallel ($H_{TP}$) and 13 kilogauss normal ($H_{TN}$). This represents an anisotropy factor ($a$) of 3.8. At 40 amperes, the factor ($a$) is 60/15=4; at 30 amperes, ($a$) is 68/18=3.8.

The import of this data is that conventional strip wound magnet designs which generally present their fields to the strip with a maximum transverse parallel component can be made with higher design values, or alternatively, with savings in superconductor material for a given design field value.

Another, and surprising, aspect of the performance of the strip 110 is that the performance of the strip in a transverse normal field is scarcely varied by the concurrent application of a transverse parallel field component of like magnitude. In some instances, the transverse normal performance seems to be slightly improved by the presence of a transverse parallel component. Of course, both the normal and perpendicular fields must be within the limits for the material (indicated for the strip 110, for instance, by the intercepts of the constant current curves with the $x$ and $y$ axes of FIG. 4).

This discovery of this second aspect makes the concept of the present invention feasible for use in construction of magnets because in most solenoid magnets the maximum transverse normal component of field is considerably smaller than maximum transverse parallel component of field in the vicinity of the windings.

FIG. 5 shows a schematic solenoid magnet wound from strip 110 (three layers, each three turns long) about a stainless steel form to produce a field H. Preferably, but not necessarily, iron end plates and an iron shroud are provided around the windings to provide a magnetic field return path which further protects the windings from attack by a large transverse normal field.

Another feature of the invention is its excellent stability due to perfect bonding between the copper and ribbons as indicated by a bond resistance of less than 1 micro-ohm for each square centimeter of gross interfacial surface.

It will be apparent to those skilled in the art that many features of the conductor can be varied within the scope of the present invention. For instance, the above example involved cold rolling reduction to an extent of 15 times area reduction. We have also obtained similar anisotropy characteristics with as little as six times area reduction. Indeed, anisotropy would be realized with as little as three times area reduction. The critical currents are, of course, enhanced by more cold work such as would be possible in designing strip down to about .05 inch thickness. It is therefore intended that the above description shall be read as illustrative and not in a limiting sense.

What is claimed is:

1. A composite-strip-conductor consisting essentially of a strip of high conductivity, non-superconductive metal with a thickness in excess of .05 inch and a width greater than its thickness and containing within the conductor a plurality of inner alloy ribbons, each having a width dimension paralleling the strip width dimension and a thickness dimension paralleling the strip thickness dimension, the ribbon width dimension being at least five times its thickness and wherein the ribbons have a critical current-versus-field anistropy factor of at least two where the anisotropy factor is given by:

$$a = H_{TP}/H_{TN}$$

where $H_{TN}$ is the applied magnetic field in a direction transverse and normal to the strip corresponding to a given critical current and $H_{TP}$ is the higher applied magnetic field in a direction transverse and parallel to the strip necessary to produce quenching at the same current, the inner ribbons being metallurgically bonded to the high conductivity metal around essentially the full periphery of the inner ribbons with a bond resistance of less than one micro-ohm for each square centimeter of gross interfacial surface said ribbons being all arranged essentially parallel and in at least one straight row extending across the width dimension of the strip with the ribbons in a row spaced from each other.

2. The conductor of claim 1 wherein the conductor contains a plurality of inner superconductive alloy ribbons, all arranged essentially parallel and in essentially two spaced rows.

3. The conductor of claim 1 as a solenoid winding.

References Cited

UNITED STATES PATENTS 3,366,728   1/1968   Garwin et al. _____ 335—216X

FOREIGN PATENTS 1,452,977   8/1966   France _____ 335—216

OTHER REFERENCES

The Review of Scientific Instruments, vol. 36, No. 6, June 1965, an article by Laverick et al., pp. 825–830.

GEORGE HARRIS, Primary Examiner

U.S. Cl. X.R.

174—126